(No Model.)

P. E. MATTHES.
BICYCLE SIGNAL.

No. 525,153. Patented Aug. 28, 1894.

Witnesses:
Eugene P. Eadson
E. B. Williams

Inventor:
Percy E. Matthes
by Geo. H. Holgate
Attorney.

UNITED STATES PATENT OFFICE.

PERCY E. MATTHES, OF PHILADELPHIA, PENNSYLVANIA.

BICYCLE-SIGNAL.

SPECIFICATION forming part of Letters Patent No. 525,153, dated August 28, 1894.

Application filed May 14, 1894. Serial No. 511,103. (No model.)

*To all whom it may concern:*

Be it known that I, PERCY E. MATTHES, a citizen of the United States, residing at Philadelphia, in the county of Philadelphia and State of Pennsylvania, have invented certain new and useful Improvements in Bicycle, Car, and Vehicle Signals; and I hereby declare that the following is a full, clear, and exact description of my invention, which will enable others skilled in the art to which it appertains to make and use the same.

My invention relates to certain new and useful improvements in audible bicycle and car signals, and is specially designed for use on bicycles and street railway cars of all descriptions, and for all descriptions of ordinary wheeled vehicles propelled by power, such as steam, air, electricity, or manual, as with the bicycle, whereby a warning of the approach of the car or other vehicle will be given by the automatic and continuous ringing of the bells.

The objects of my invention are: First. To provide a ready and convenient means of applying an alarm signal for bicycles and street cars of all classes that can be readily adjusted to the axle of the bicycle and street cars, and that can be instantly replaced in case of accidental breakage or injury, without long delay, by its adaptability to fit many different sizes of axles, &c. Second. To supply an adjustable alarm signal for use on vehicles of all descriptions, and which may be readily attached to the axle, if the same revolves, or if desired, to the hub of the wheel, the peculiar construction and its adjustability rendering it, when manufactured in a smaller form, a desirable alarm attachment for bicycles. Third. To provide an adjustable, audible alarm signal for bicycles, cars and vehicles that will be entirely automatic in action, when the vehicle to which it is attached is moving, efficient in its operation, extremely simple in construction, and inexpensive to manufacture.

Figure 1:
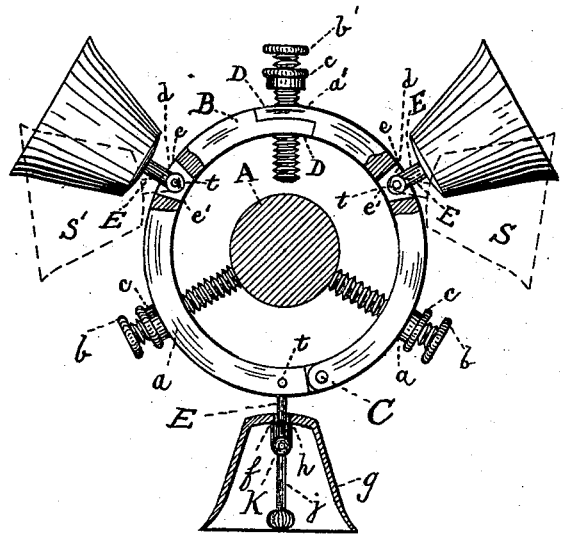
Figure 2:
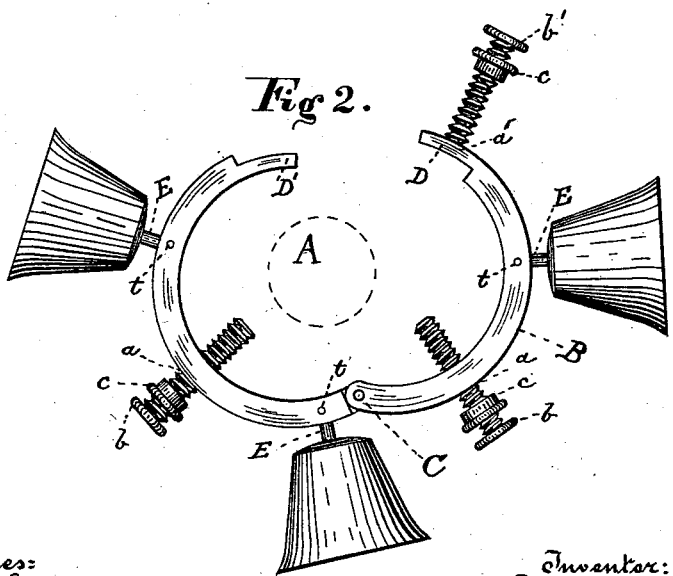

In the accompanying drawings, Figure 1 shows a side view of my invention as applied to the axle or hub. Fig. 2 shows a side view of the invention in a position as being put on or applied to axle or hub of vehicle.

Similar letters of reference refer to the same parts in both figures.

A represents the axle or hub of a car, or any other description of vehicle; B is an annular ring of any desired size to suit the requirements of the vehicle to which it is to be applied, and is provided with a hinged joint C and transverse, angular, separable, jointed ends D and D'.

At equal distances apart, the ring A is provided with three threaded apertures $a\ a\ a'$, each of these having a screw $b\ b$ and $b'$. The aperture $a'$ is made directly through the two transverse, angular separable jointed ends D and D', and the screw $b'$ passes through both of the jointed ends D and D', thereby binding them tightly together. Each of the screws $b\ b$ and $b'$ is provided with a locking nut $c$, which secures the screws from becoming loose. The ring A also has longitudinal openings $d$, these openings being larger or longer at their outer end $e$, and shorter or narrower at their inner side of the ring, as at $e'$. Within this aperture $d$, the pivoted bell carrier bar E is pivoted. This bell carrier bar E passes through the aperture $f$ of the bell $g$, which being larger than the bar E permits the bell $g$ to freely rotate or turn, with a movement like a swivel on the shoulder $h$ of the bar E. The bell carrier bar E is provided below the shoulder $h$ with a hinged joint $k$, to which is pivoted the clapper $j$.

In Fig. 2, a view is shown illustrating the two parts, D and D' of the hinged or separable jointed ring, as being open and in position to be placed on the axle or hub A shown in dotted line, and adjusted in position by means of the screws $b\ b$ and $b'$ as shown in Fig. 1.

In Fig. 1, the device is shown as partly adjusted in position, the two screws $b\ b$ are tightened against the axle or hub A, and the third screw $b'$, and which serves the purpose of securing the ends D and D' of the ring, as being partially in its position.

The peculiar form given to the openings $d$ in the ring, in which is pivoted the bell carrier bar E, being larger at $e$, permits the bell as it is carried round by the rotating shaft A to drop or fall over alternately in the position as shown by the dotted lines S and S', the edge of the slotted opening $d$, forming a stop, which abruptly receives the blow of the bell carrier bar E, as it falls over, and consequently increases the number of vibratory movements of the bell, and clapper j.

The movement and vibration of bell are much increased by its being provided with the enlarged opening f and resting loosely on the shoulder h of the bell carrier bar E, pivoted at t, and the clapper j pivoted at the joint K, the bell being free to turn as it will, and acting as with a swivel motion.

Having fully described the various parts and construction comprised in my invention, I deem it unnecessary to further describe the operation of the invention as it will be obvious to the mechanic and others, when reference is had to the figures comprised in the accompanying drawings.

I am aware that car signals, or alarms, comprising in their construction a bell, and means of attaching the same to axles, have already been patented. I therefore, only claim broadly the particular construction, arrangement and action of an audible signal alarm as applied to bicycles, cars, or other wheeled vehicles, as embraced within the scope of my invention as shown in the accompanying drawings, and operating as described, and

What I claim as new, and desire to secure by Letters Patent, is—

1. A signal, comprising a separable attaching head, consisting of two members hinged together and having their adjoining faces concaved, in a manner to form, centrally thereof, an approximately circular opening, and threaded pins, passing through the head and radially disposed within the opening, one of the pins serving to connect the free ends of the members, and a plurality of bells, pivoted to the head, as specified.

2. A bicycle, car or vehicle signal, comprising in its construction, an annular, hinged ring, having threaded apertures in said ring and screws or bolts fitted to said apertures provided with binding or lock nuts, and adapted to secure the said annular hinged and jointed ring, by being suitably adjusted to the axles of bicycles and cars, or axles or hubs of other vehicles, and having openings in said ring, longer at the outer side of ring than on their inner side, in which is pivoted a swinging bell bar, carrying the bell with a swivel like attachment, and said bar having a joint to which is pivoted the clapper of the bell, and operating by the action of the hub or axle, all operating and combined, substantially as shown and described and for the purpose set forth.

In testimony whereof I have affixed my signature in the presence of two subscribing witnesses.

PERCY E. MATTHES.

Witnesses:
P. E. PIERCE,
EUGÈNE P. EADDON.